C. S. BRYANT.
HEATING SYSTEM FOR INCUBATORS.
APPLICATION FILED OCT. 5, 1912.
Reissued Jan. 21, 1913. 13,515.
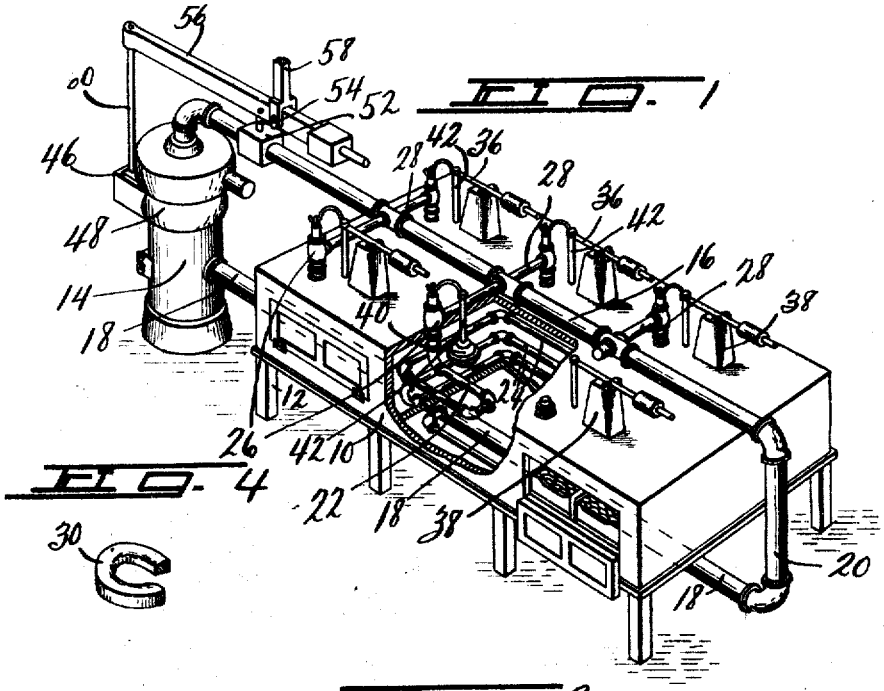
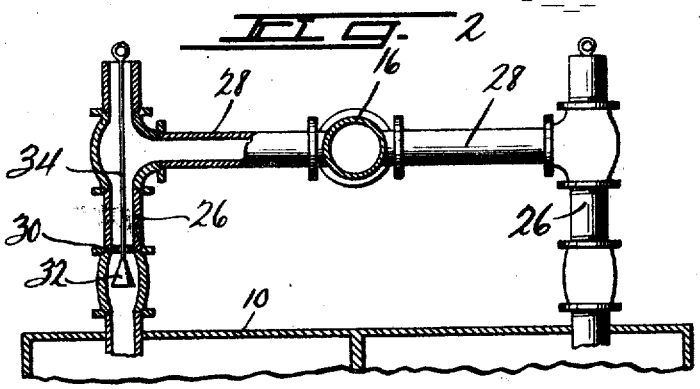
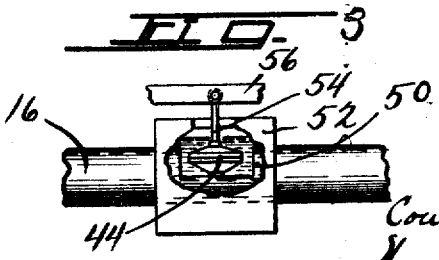
Witnesses:
H. Wurst
E. A. Thompson
Courtney S. Bryant
Inventor
Howard P. Denison
By Attorney

UNITED STATES PATENT OFFICE.

COURTNEY S. BRYANT, OF GREENE, NEW YORK, ASSIGNOR TO WILLIS A. SCHLEIT, OF SYRACUSE, NEW YORK.

HEATING SYSTEM FOR INCUBATORS.

13,515. Specification of Reissued Letters Patent. Reissued Jan. 21, 1913.

Original No. 1,015,290, dated January 23, 1912, Serial No. 548,603. Application for reissue filed October 5, 1912. Serial No. 724,222.

*To all whom it may concern:*

Be it known that I, COURTNEY S. BRYANT, of Greene, county of Chenango, and State of New York, have invented new and useful Improvements in Heating Systems for Incubators, of which the following, taken in connection with the accompanying drawings, is a full, clear, and exact description.

This invention relates to incubators, and particularly to incubators of the multiple section or multiple compartment type which are so constructed and arranged that one section may be operated alone or that two or more sections may be operated simultaneously. Incubators of this general type have recently come into quite extensive use, but in their operation difficulties have been encountered, particularly in the matter of maintaining the desired temperature in each of the compartments.

By most systems of supplying heat and controlling the temperature hitherto employed irregularities in the temperature of some or of all of the compartments have been liable to occur, such irregularities being due, for the most part, either to excessive circulation through the heating coils of a heating fluid which has been raised to a comparatively high temperature, or to deficient circulation of the heating fluid when its temperature has been comparatively low. In either case, of course, the effect is injury to the hatch, and a multiple compartment incubator in which irregularities of this sort are liable to occur requires almost as much attention as a plurality of separate incubators and the danger of destroying a large number of eggs at one time is obviously greater.

An object of this invention is to provide a multiple compartment incubator having improved means for maintaining at the required temperature each of the compartments.

A further object of the invention is to provide an incubator of this type in which the danger of accidental injury to the hatch, through carelessness, will be reduced to a minimum.

To this end the invention aims to provide automatic means for controlling both the temperature of the heating fluid and its circulation in such manner that overheating of the fluid before it reaches the compartment radiators may be avoided and that the circulation of the fluid through the compartment coils, or other radiating means, may be accurately gaged to meet the requirements of each compartment.

In the preferred embodiment of the invention, the compartments, for convenience, are arranged in horizontal lines and it will be readily understood that with this arrangement the provision of automatic heat regulating means which may be depended upon is especially important. Preferably a single heater is employed and from this runs a main, or primary, circulating system for the heating fluid, comprising, preferably, an outgoing fluid conductor lying in a plane above the compartments and a return conductor lying in a plane below the compartments. The compartment radiators, preferably in the form of coils and sometimes hereinafter referred to as secondary circulating systems, are independently connected to the outgoing and return conductors, or, to adopt electrical parlance, the compartment radiators are connected "in parallel."

In order that the temperature of the heating fluid may be substantially the same throughout the outgoing conductor, the main, or primary, circulation is preferably completed by a free connection between the outgoing and return conductors which is independent of the connections through the radiating coils. To maintain a substantial uniformity of the temperature of the heating fluid as it enters the radiating coils and thereby avoid accidents due either to overheating or underheating, the temperature of this fluid, in the preferred embodiment of the invention, is thermostatically controlled by means of a thermostat located, preferably, in the outgoing conductor.

The temperature of each compartment, in the preferred embodiment, is regulated by thermostatic control of the heating fluid through the radiating coils, the thermostat being located in the compartment and arranged to control a valve in the connection between the radiating coils and the main circulating system.

Important features of the invention are the improved means for controlling the temperature of the main circulation and the improved means for regulating the circulation of the heating fluid through the radiating coils.

Figure 1 is a perspective view of a multiple compartment incubator embodying the invention; Fig. 2 is a cross section showing especially the details of construction of the means for controlling the circulation of the heating fluid through the compartment coils and the arrangement of these coils, and Fig. 3 is a sectional detail showing the arrangement of the thermostat for controlling the temperature of the main circulation. Fig. 4 is a perspective detail showing the transversely rounded construction of the valve seat.

As hereinabove suggested, the compartments are preferably arranged in a horizontal line, or in horizontal lines, and in the illustrated embodiment of the invention the compartments are formed in a housing 10 supported upon legs 12, there being, as herein shown, two rows of compartments arranged back to back. The rows may obviously consist of any desired number of compartments. Moreover it will be understood that the rows of compartments may be arranged in tiers, as well as back to back, or that these two arrangements may be combined.

The heating fluid employed is preferably water and this may be heated in any suitable heater 14. Connected to the heater is the main circulating system which comprises an outgoing conductor 16 and a return conductor 18, these two conductors being connected at their outer ends by a vertical connection 20, preferably of the same cross section, whereby a free circulation of the water through the main circulating system is permitted.

The compartment circulating systems, or compartment radiators, comprise each an overhead coil 22 which is continuous with the lateral coil 24, the latter coil insuring proper heat in the corners of the compartment and the overhead coil insuring proper heat in the middle of the compartment. The compartment radiators are connected at their respective termini to the outgoing and return conductors of the main circulating system whereby a circulation of the heating fluid through said radiators is insured.

To provide for proper control of the circulation of the heating fluid through the compartment circulating systems the connection between each compartment radiator and the outgoing conductor comprises a vertical pipe 26 extending above the level of the heating fluid in the main circulating system and a horizontal pipe 28 extending between a T-joint in the outgoing conductor 16 and a T-joint in the vertical pipe 26 and serving to conduct the heating fluid from said outgoing conductor into the vertical pipe 26 and thereby into the compartment radiator. Below the T-joint in the vertical pipe 26 is a valve seat 30 for a valve 32, formed as a true cone and suspended by its apex by a cord 34 connected to one arm of a counterbalanced lever 36 fulcrumed upon a standard 38 mounted upon the top of the housing 10. The valve seat 30 is transversely rounded, thereby permitting the cone 32 to seat itself easily and tightly, the transverse rounding of the seat in combination with a conical valve also providing a construction in which sticking of the valve in its seat is avoided.

The valve construction is an important feature of the invention since it insures substantially positive control of the circulation through the compartment radiator and, therefore, when operated from a thermostat in the compartment insures substantially uniform temperature of the compartment.

The thermostat for controlling the compartment temperature may be of any suitable or usual construction, the thermostat 40, herein shown, being connected by a rod 42 to the lever 36 in such manner that when the temperature in the compartment rises it tends to close the valve in the pipe 26 and cut down the flow of the water from the outgoing conductor 16 into the compartment radiator.

To further insure stability of the compartment temperature means is provided for regulating the temperature of the water in the main circulation. The illustrated means, which constitutes an important feature of the invention, comprises a thermostat 44 located in the outgoing conductor 16 and arranged to control a check damper 46 by which more or less cold air is admitted to the drum 48 of the heater 14. To receive the thermostat 44 the conductor 16 is cut down at 50 about one half its diameter and a sleeve or box 52 surrounds and covers this cut away portion, this sleeve or box being provided upon its upper side with an opening through which passes a rod 54 connected at one end to the thermostat 44 and at its other end to one arm of a counterbalanced lever 56 fulcrumed in a yoke 58 suspended from any convenient overhead support. As herein shown the sleeve or box 52 is the highest part of the main circulating system and the water for this system is introduced through the opening in the upper side of this box. The check damper 46 is suspended by a rod 60 from the same arm of the lever 56, the leverage being so arranged that a small movement in the thermostat will produce a comparatively large movement of the damper 46.

It will be noted that the described means for controlling the temperature of the water in the main circulation is very simple and very efficient and that it is so constructed and arranged that it is not influenced by variations in pressure of any kind. It will be noted further that the main circulating system is free from complexities which tend to disturb the circulation of the water therethrough, that the outgoing and return conductors are so arranged that a clear differential in temperatures readily establishes itself between them and, once established, remains established, and that the compartment circulating systems, are so arranged as to take full advantage of the differential between the outgoing and return conductors.

As above suggested, the construction and arrangement of the valve constitute important features of the invention and, in addition to the advantages of the illustrated construction, above pointed out, it may be noted that the arrangement of the cone 32 so that it moves to open position in the direction of the movement of the heating fluid through the compartment system, is important since it prevents the accumulation of dirt or other sediment on the valve seat to interfere with the seating of the valve. The transverse rounding of the valve seat 30 is also important, as above suggested, since thereby the contact surfaces are reduced to a minimum and seating is easily effected and sticking avoided.

Having described my invention what I claim as new and desire to secure by Letters Patent is:

1. An incubator comprising, in combination, a plurality of compartments arranged horizontally, a main circulating system for the heating fluid comprising an outgoing conductor lying in a plane above the compartments and a return conductor having at all times free communication with the outgoing conductor and lying in a plane below the compartments, compartment circulating systems each communicating at its respective termini with the outgoing and return conductors, means for automatically controlling the temperature of the heating fluid in the main circulating system, and means for automatically and independently controlling the circulation of the heating fluid through each of the compartment circulating systems.

2. An incubator comprising, in combination, a main circulating system for the heating fluid, a compartment circulating system communicating with the main circulating system, means for automatically controlling the temperature of the fluid in the main circulating system, a valve centrally suspended in the communication between the main circulating system, and the compartment circulating system and gravitating to open position in the direction of flow of the heating fluid through said compartment system, a thermostat in the compartment and operative connections between said valve and said thermostat whereby a rise in temperature in the compartment effects a positive movement of said valve against the flow of the fluid toward closed position.

3. An incubator comprising, in combination, a main circulating system for the heating fluid, a compartment circulating system communicating with the main circulating system, means for automatically controlling the temperature of the fluid in the main circulating system, a valve in the communication between said circulating systems comprising a true cone arranged to move to open position in the direction of flow of the heating fluid through said compartment system, a transversely rounded seat for said valve, and thermostatic means for controlling the movements of said valve in accordance with variations in the temperature of the compartment.

4. An incubator comprising, in combination, a compartment, fluid heating means, a main circulating system for the heating fluid comprising an outgoing conductor arranged above the compartment and a return conductor arranged below the compartment, a compartment circulating system communicating at its respective ends with the outgoing and return conductors, the communication between the outgoing conductor and compartment system comprising a vertical pipe, the open upper end of which is above the level of the heating fluid in the main circulating system, a conical valve suspended by its apex in said pipe below the point at which the heating fluid is introduced, a valve seat above said valve and below said point, and thermostatic means for controlling the movement of said valve in accordance with the variations of temperature in said compartment.

5. An incubator comprising, in combination, two rows of compartments arranged in horizontal lines, back to back, fluid heating means, a main circulating system for the heating fluid comprising an outgoing conductor extending along a median line above the rows, a return conductor in substantially a similar location below the rows and means providing free communication between the outer ends of said conductors, compartment circulating systems each communicating at its respective ends with the outgoing and return conductors, thermostatic means for maintaining at substantial uniformity the temperature of the heating fluid in the outgoing conductor, a valve in the communication between the outgoing conductor and each compartment system, and a thermostat in each compartment operatively connected with the appropriate valve to control the circulation of the heating fluid through the compartment system in such a manner that the temperature of the compartment is maintained at substantial uniformity.

6. An incubator having, in combination, a main circulating system for the heating fluid, a compartment circulating system communicating with the main circulating system, means for automatically controlling the temperature of the fluid in the main circulating system, and a thermostatically controlled valve in the communication between the main system and the compartment system, said valve comprising a cone suspended by its apex to move to open position in the direction of movement of the fluid through the compartment system, and a transversely rounded seat with which the side of said cone is adapted to engage.

7. In an incubator a main circulating system comprising an outgoing conductor and a return conductor having at all times free communication with each other, a thermostat, located in the heating fluid in the highest part of the main circulating system, means controlled by said thermostat for regulating the heat imparted to the fluid in the main circulating system, compartment circulating systems connected at their respective termini to the outgoing and return conductors, a valve centrally suspended in the communication between each compartment system and the outgoing conductor gravitating to open position in the direction of flow of the heating fluid, a thermostat in each compartment, and connections between each of said last named thermostats and its respective valve for positively moving said valves against the flow of the fluid toward seating position as the temperature in the compartments increases.

8. An incubator comprising, in combination, a plurality of compartments arranged horizontally, a main circulating system for the heating fluid comprising an outgoing conductor and a return conductor having at all times free communication with the outgoing conductor, compartment circulating systems each communicating at its respective termini with the outgoing and return conductors, means for automatically controlling the temperature of the heating fluid in the main circulating system, and means for automatically and independently controlling the circulation of the heating fluid through each of the compartment circulating systems.

In testimony whereof I have signed my name to this specification in the presence of two subscribing witnesses.

COURTNEY S. BRYANT.

Witnesses:
GEORGE L. PAGE.
FRED E. PAGE.

Disclaimer in Reissue Letters Patent No. 13,515.

DISCLAIMER.

13,515. (Reissue.)—*Courtney S. Bryant*, Greene, N. Y. HEATING SYSTEM FOR INCUBATORS. Patent dated January 21, 1913. Disclaimer filed September 28, 1915, by the assignee, *Willis A. Schleit.*

Enters this disclaimer—

"To that part of the claim in said specification, being claim 8 thereof, which is in the following words, to wit:

"An incubator comprising, in combination, a plurality of compartments arranged horizontally, a main circulating system for the heating fluid comprising an outgoing conductor and a return conductor having at all times free communication with the outgoing conductor, compartment circulating systems each communicating at its respective termini with the outgoing and return conductors, means for automatically controlling the temperature of the heating fluid in the main circulating system, and means for automatically and independently controlling the circulating of the heating fluid through each of the compartment circulating systems."

(*Official Gazette, October 5, 1915.*)